United States Patent [19]

Aguayo, Jr. et al.

[11] Patent Number: 5,675,372
[45] Date of Patent: *Oct. 7, 1997

[54] WIRELESS TWO-WAY COMMUNICATION SYSTEM BETWEEN CENTER AND USER STATIONS

[75] Inventors: Erwin Aguayo, Jr., Columbia, Md.; Steven J. Crowley, Washington, D.C.

[73] Assignee: Intrinzix Technologies, Inc., Gaithersburg, Md.

[*] Notice: The term of this patent shall not extend beyond the expiration date of Pat. No. 5,555,015.

[21] Appl. No.: 665,473

[22] Filed: Jun. 18, 1996

Related U.S. Application Data

[63] Continuation of Ser. No. 406,529, Mar. 20, 1995, Pat. No. 5,555,015.
[51] Int. Cl.$^6$ ............................................. H04N 7/173
[52] U.S. Cl. ........................... 348/12; 348/6; 455/3.1; 455/5.1
[58] Field of Search ......................... 348/6, 8, 9, 10, 348/11, 12, 13, 1, 2, 3, 7; 455/3.1, 3.2, 4.2, 5.1, 6.1, 14, 67.3; H04N 7/16, 7/173, 7/20, 7/10

[56] References Cited

U.S. PATENT DOCUMENTS

| | | | |
|---|---|---|---|
| 4,118,669 | 10/1978 | Fung | 380/20 |
| 4,222,066 | 9/1980 | Zelenz | 348/6 |
| 4,367,557 | 1/1983 | Stern et al. | 348/6 |
| 4,461,032 | 7/1984 | Skerlos | 348/10 |
| 4,792,848 | 12/1988 | Nussrallah et al. | 348/7 |
| 5,058,198 | 10/1991 | Rocci et al. | 348/6 |
| 5,257,099 | 10/1993 | Morales-Garza | 348/12 |
| 5,331,412 | 7/1994 | Farmer et al. | 348/5.5 |
| 5,394,559 | 2/1995 | Hemmie et al. | 348/13 |
| 5,505,901 | 4/1996 | Harney et al. | |
| 5,555,015 | 9/1996 | Aguayo | 348/6 |

FOREIGN PATENT DOCUMENTS

| 112384 | 6/1985 | Japan | H04N 7/173 |
|---|---|---|---|

*Primary Examiner*—John K. Peng
*Assistant Examiner*—Chris Grant
*Attorney, Agent, or Firm*—Oblon, Spivak, McClelland, Maier & Neustadt, P.C.

[57] ABSTRACT

The present invention is directed to a communication system which can be utilized to complement an existing cable television system in which a central office transmits signals along a coaxial cable to a user unit through a tap. The communication system features a central transmitting/receiving unit for wirelessly transmitting first signals generated at the central office and for receiving second signals. A first response unit which may be connected to the tap will receive the first signals wirelessly transmitted from the central transmitting/receiving unit, and will generate and wirelessly transmit the second signals to be received by the central transmitting/receiving unit. A further second response unit may be connected to the user unit, and the second response unit may generate a third signal to be wirelessly received by the first response. The third signal may be used to control the tap connected to the first response unit. Further, a relay unit may be provided to facilitate transmission between the first and second response units in the central transmitting/receiving unit.

24 Claims, 6 Drawing Sheets

WIRELESS TWO-WAY COMMUNICATION SYSTEM BETWEEN CENTER AND USER STATIONS

This is a continuation of application Ser. No. 08/406,529, filed on Mar. 20, 1995, now Pat. No. 5,555,015.

BACKGROUND OF THE INVENTION

1. Field of the Invention

The present invention is directed to a two-way communication system which may find particular application as a complement to existing cable television communication systems.

2. Discussion of the Background

Figure 1:
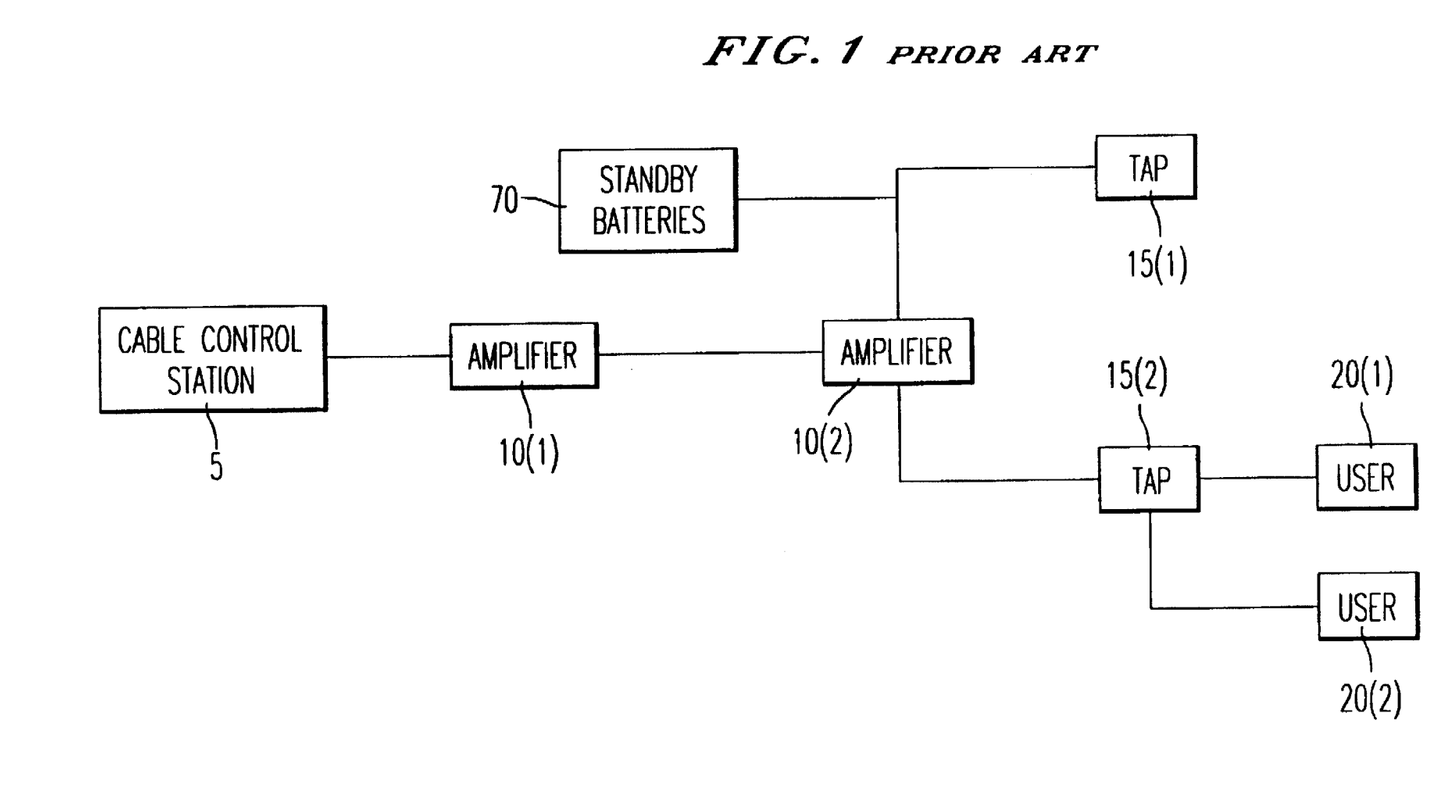
FIG. 1 represents a conventional cable system.

Cable television systems are conventional and well known, and a schematic diagram of a conventional cable television system is shown in FIG. 1. As is shown in FIG. 1, a conventional cable television system features a cable control station 5 which has a coaxial cable output therefrom. The coaxial cable carries television and control signals. Along the transmission path, amplifier stages 10(n) are utilized to amplify the transmitted signals to ensure that the signals transmitted along the coaxial cable are at an appropriate amplitude. Also, standby butteries 70 may be connected along the transmission path to provide back-up power in the event of a power failure. Connected to the amplifier stages 10(n) are various taps 15(n), and output of these taps 15(n) are the coaxial cables which are input to a user 20(n), e.g., the home of the customer. These taps 15 are typically formed on a utility pole, in an underground pedestal or, in a case of an apartment building, within a security closet.

Conventional cable systems suffer from several significant shortcomings and drawbacks.

One significant drawback is that the theft of the cable signals transmitted along the coaxial cable is very common. One type of cable theft is an unauthorized user simply accessing the cable tap 15, connecting an unauthorized cable thereto, and receiving the signals from the cable. Such a theft however typically does not allow the cable thief to access premium channels or pay-per-view channels. A further type of theft is if a user further has a decoder or descrambler to gain access to the scrambled premium or pay-per-view channels.

Cable systems have developed various techniques to combat such cable theft. To prevent unauthorized access of a tap, a locking terminator may be placed on the tap itself. One way of preventing viewers from receiving the premium or pay-per-view channels is that an extraneous signal, which may typically be 2.5 MHz, is inserted above a normal visual carrier. This causes the television at the user 20 to think it is receiving a strong signal, and the television then automatically adjusts for this gain, which results in overriding or hiding the real cable signal. To overcome these situations, a trap must be placed at the tap 15 to remove this extraneous signal, and this thereby allows any authorized channel to be viewed by the user 20.

Such a security system to ensure that users 20 only receive cable if they have paid for the service and receive the channels they pay for has a significant drawback in that any time a user 20 changes their service and either is entitled to receive additional channels or cancels certain channels, the cable system must dispatch a technician to the appropriate tap 15 to change the configuration of the traps therein. This is a costly and time consuming operation and a significant drawback in such a system.

Furthermore, any time a user 20 cancels a cable service, a technician must also physically go to the appropriate tap 15, which may typically be on a utility pole, disconnect the cable and, possibly place a physical lock on the tap 15. Such an operation is again costly and time consuming for the cable systems.

Another common situation of cable theft is the inadvertent theft of services. In such a situation, a cable user 20 inadvertently receives channels which the user 20 is not paying for and authorized to receive. This situation often occurs when a cable technician fails to disconnect the cable or install the appropriate traps in the taps 15 to block channels from reaching a user. Such a type of inadvertent cable theft is very difficult to detect in conventional cable systems as they can only be detected by a visual inspection of the taps 15.

A further problem in conventional cable systems is effectively addressing a cable-out situation in which for some reason cable signals are not properly transmitted to certain users. Such a cable-out situation may occur if a cable gets cut, if there is a power loss, etc. The conventional way of detecting such a cable-out situation is for a cable system to await complaints from the users, and then to send a technician to determine the cause of the cable-out.

A cable-out can be caused by a loss of electrical power. In such a situation, a user 20 that is experiencing a cable-out may not be experiencing a similar power loss in their home as their home may be served by a different utility transformer than the cable. It is common for a cable system to have standby batteries 70 to accommodate for a loss of power cable-out. The condition of the standby batteries 70 will determine if an affected area experiences a cable-out as a result of the power loss. If the batteries are at full power, then the batteries may be able to provide power during a power loss.

To test the status of such standby batteries 70, cable systems must periodically send a technician out to the battery sites to physically test each battery unit. Such a procedure of determining the status of the standby batteries 70 is very costly and time consuming.

Also, and with reference to FIG. 1 of the present specification, several amplifier stages 10(n) are formed along the cable transmission path to ensure that the transmission signal provided to the users 20 is at an appropriate level. These amplifiers may include manual trunk amplifiers, automatic trunk amplifiers, trunk/bridging amplifiers, line extending amplifiers, and may also include AC power supply units or power inserts. If one of these amplifiers 10 malfunctions, a cable-out may occur to a user. In such a situation, to determine the cause of the cable-out, the cable system will have to send a technician out to check all possible causes of the cable-out, and to determine whether the amplifier stages 10 have any malfunctions. Such a procedure of determining the status of the amplifiers 10 is very time consuming and costly to the cable system.

Another problem with cable systems is that cable systems are required by the Federal Communications Commission to test for signal leakage or radiation. Conventionally, this test is performed by sending a technician out into the cable franchise area with a detector for detecting for such signal leakage or radiation. Again, such a testing operation which requires a time consuming operation by a technician is very inefficient.

One common and significant inefficiency in the operation of a standard cable system such as is shown in FIG. 1 is the necessity for a manual contact or disconnect of the service at the tap 15(n). That is, in conventional cable systems, each time a user 20 requests a connect or disconnect, the cable system must dispatch a technician to the appropriate tap 15(n) to connect or disconnect the service. This is a costly and time consuming operation and a significant drawback in such a system.

There has also been an increase in the demand for two-way communication between a cable user and the cable control system. For example, such two-way communication can be used to allow the cable user 20 to order pay-per-view programming being offered by the cable system. An effective supply of such programming is important for a cable system as it is a significant source of revenue for the cable system. At the present time, systems for allowing the user to control such pay-per-view operations either require the user to have a specialized cable box and the cable system must be designed for two-way communication or the user must call the cable system to order special programming.

The two-way communication system requires very complicated circuitry in allowing two-way communication along the cable, and is particularly difficult to implement in cable systems which have already been installed and designed without such a feature. The user call system is cumbersome for the user and requires extensive communication equipment hooked to the phone lines.

SUMMARY OF THE INVENTION

Accordingly, one object of the present invention is to provide a novel communication system which can be used in complement with a cable television system which overcomes the problems and drawbacks in conventional cable systems.

A further more specific object of the present invention is to provide a novel communication system for use with a cable television system which allows more efficient control of the cable signal passing through a tap to a user.

A further more specific object of the present invention is to provide a novel communication system for use with a cable television system which allows more efficient monitoring of cable theft.

A further more specific object of the present invention is to provide a novel communication system for use with a cable television system which allows more efficient monitoring of cable-outs.

A further more specific object of the present invention is to provide a novel communication system for use with a cable television system which allows efficient testing of a signal leakage or radiation.

A further more specific object of the present invention is to provide a novel communication system for use with a cable television system which allows efficient two-way communication between a user and a cable control station, and particularly which allows easy two-way communication in a system which is easy to retrofit on existing cable systems.

The objectives of the present invention are achieved by a novel communication system for use with a cable television system in which a central office transmits signals along a coaxial cable to a user unit through a tap. According to the communication system of the present invention, a central transmitting/receiving unit wirelessly transmits first signals generated at the central office, and the central transmitting/receiving unit also receives second signals. A first response unit receives the first signals wirelessly transmitted from the central transmitting/receiving unit, and generates and wirelessly transmits the second signals to be received by the central transmitting/receiving unit. The first response unit may be connected to the tap through which the user unit receives the cable signals.

As a further feature of the present invention, a second response unit may be connected to the cable box of the user unit, and the second response unit may generate a third signal to be wirelessly received by the first response unit or central transmitting/receiving unit. This allows effective two-way communication between a user unit and a cable control station.

The system of the present invention also allows effective monitoring of the tap to determine cable theft and a cable-out, allows an effective monitoring of a signal leakage or radiation, and permits easy and efficient control by the cable user.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
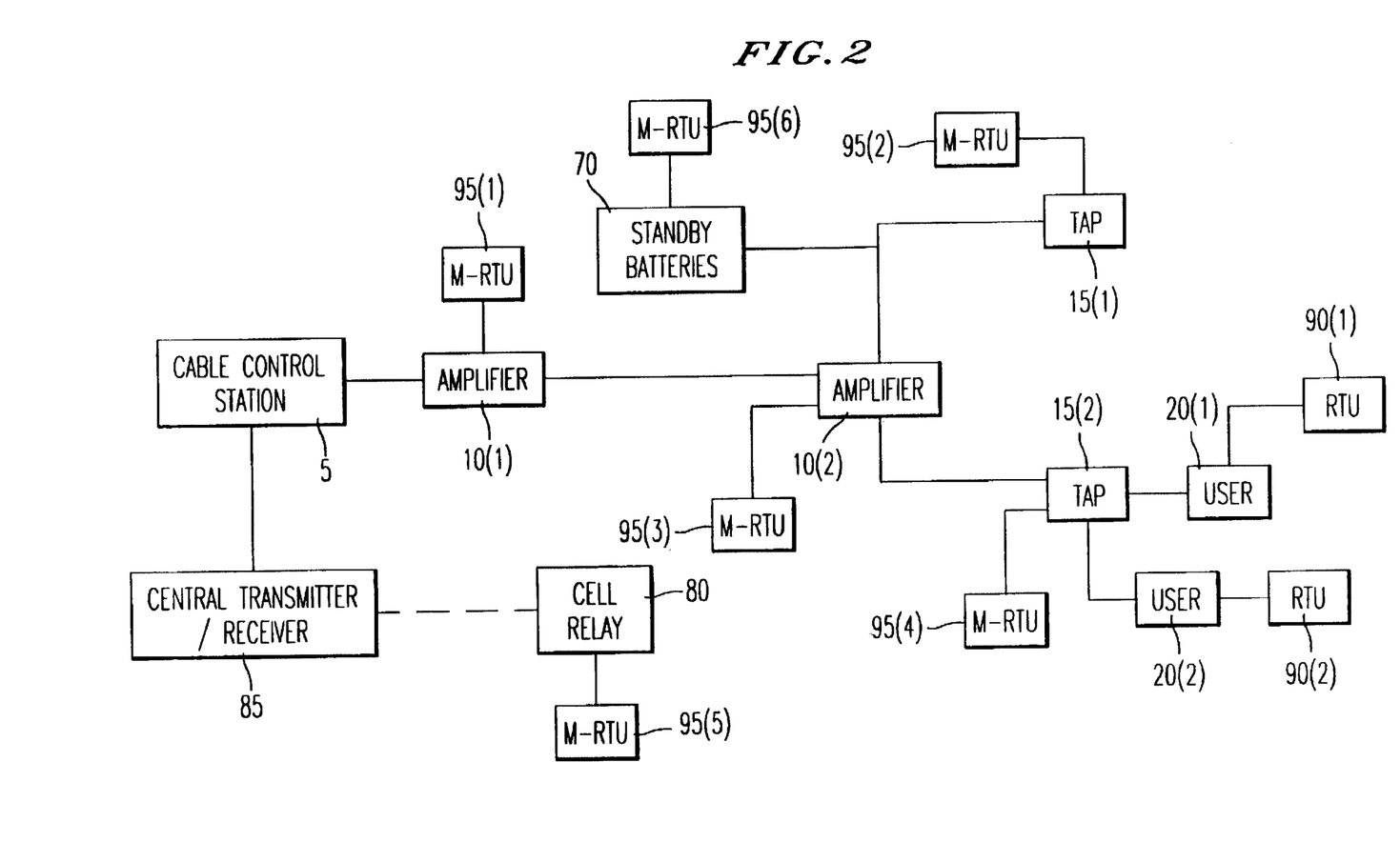
FIG. 2 represents an overview of the communication system of the present invention.

Referring now to the drawings, wherein like reference numerals designate identical or corresponding parts throughout the several views, and more particularly to FIG. 2 thereof, there is shown an overview of the communication system of the present invention.

The present invention is essentially directed to a wireless control system which can be retrofitted onto existing systems and provide a control or a monitoring of the existing systems. One preferred embodiment of the system of the present invention is as a complement to an existing cable television system, and this preferred embodiment is discussed in detail below. However, it is to be understood that the system of the present invention can find application in other types of systems which would benefit from a wireless monitoring or control.

As is shown in FIG. 2, the communication system of the present invention may operate in conjunction with the conventional cable transmission system. According to the present invention, a central transmitter/receiver unit 85 is connected to the cable control station 5. Furthermore, connected to most of the amplifiers 10, standby batteries 70, cell relay 80 and taps 15 is a respective micro-response transmitting unit (M-RTU) 95(n). Connected to each of the user units 20 is a response transmitting unit (RTU) 90(n).

According to the present invention, the cable control station 5 can generate various signals which can be wirelessly transmitted by the central transmitter/receiver 85. The signals transmitted by the central transmitter/receiver 85 are then received by the micro-response transmitting units 95. As the micro-response transmitting units 95 are connected to the amplifiers 10, standby batteries 70, cell relay 80 and taps 15, these micro-response transmitting units can generate information as to the operation of the amplifiers 10, standby batteries 70, cell relay 80 and taps 15, and can also control the amplifiers 10, standby batteries 70, cell relay 80 and taps 15.

Figure 3:
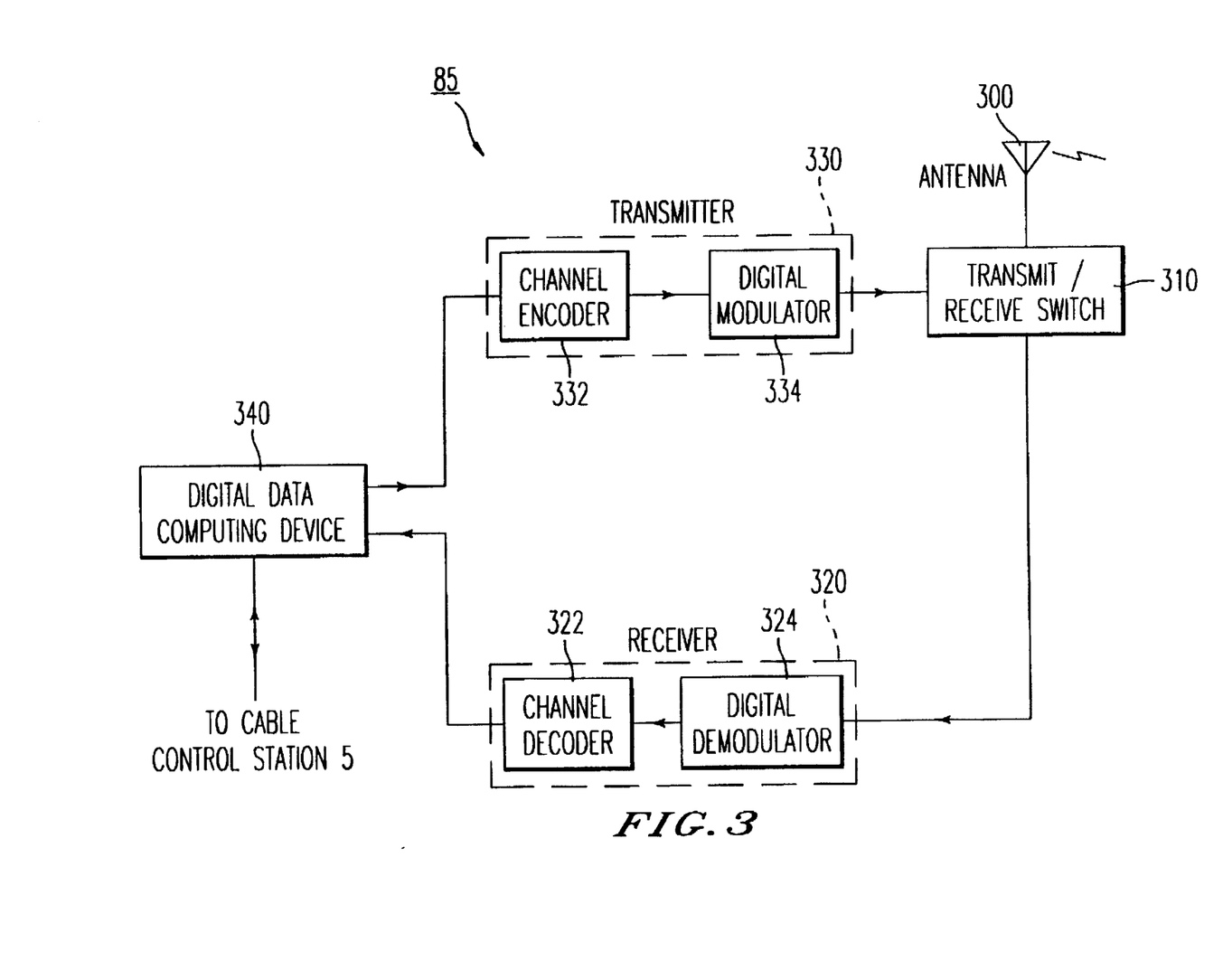
FIG. 3 shows the details of a cell transmitter/receiver shown in FIG. 2.

FIG. 3 shows a specific configuration of the central transmitter/receiver unit 85. As is shown in FIG. 3, the central transmitter/receiver unit 85 features a digital data computing device 340. This digital data computing device 340 may be formed by a higher-power computing device such as a Sun Microsystems workstation or a high-end personal computer such as a Pentium or 486 machine. This digital data computing device 340 is connected to the cable control station 5 and receives signals from the cable control station 5 and provides signals to the cable control station 5.

The signals to be transmitted by the central transmitter/ receiver unit 85 are output from the digital data computing device 340 to a transmitter 330. The transmitter 330 includes a channel encoder 332 and a digital modulator 334. According to the present invention, different signals can be sent to different receiving units by an appropriate encoding. In the present invention each M-RTU 95(n) can have an individual address. In the digital data computing device 340, a specific address of selected M-RTUs 95 can be designated if only a selected number of the M-RTUs 95 are to be addressed. The channel encoder 332 is provided to insert error detection and correction information into the transmission data stream, for example by a known ½ rate convolution encoding algorithm such as implemented in circuits by Qualcomm or Stanford Telecom.

As an example of the operation of the present invention, one signal which may be generated by the cable control station 5 is a polling signal which polls whether the amplifier units 10, standby batteries 70, taps 15 or cell relay 80 are operating properly. In this situation only the M-RTUs 95(1) and 95(3) which are connected to the amplifiers 10 need to be addressed if the operability of amplifiers 10 is being polled, or M-RTU 95(5) if the cell relay is being polled, or M-RTU 95(6) if the standby batteries 70 are being polled. In the digital data computing device 340, a code signal can be provided which is unique to only the M-RTUs 95(1) and 95(3) connected to the amplifiers 10(1) and 10(2), so that only these designated M-RTUs 95(1) and 95(3) act on the amplifier polling signals generated by the cable station 5.

The channel encoded signals are then modulated in digital modulator 334 and are then provided to transmit/receive switch 310, which may be an electronic switch or coaxial relay. Transmit/receive switch 310 controls whether the central transmitter/receiver unit 85 is operating in a transmission mode or a reception mode. The signals are then radiated by antenna 300, which may be a conventional antenna such as manufactured by Decibel Products or Scala Electronics.

Antenna 300 also receives signals generated from the M-RTUs 95 and the RTUs 90. These signals are received in receiver 320 and are demodulated in digital demodulator 324 and decoded in digital data computing device 340. Channel decoder 332 is provided to use the error detection and correction information in the decoding to increase data integrity. The received signals after error detection and correction are then supplied to the digital data computing device 340, and are then provided to the cable control station 5.

As noted above, typical types of signals generated by the central transmitter/receiver unit 85 are polling signals. A polling signal is a signal which can poll a particular unit to determine its operational status. As discussed above, each M-RTU 95 and RTU 90 may have a unique address. As a result, in the present invention each polling signal may be specifically encoded in digital data computing device 340 to be directed to particular M-RTUs 95 or RTUs 90. As each of the polling signals is transmitted, each respective M-RTU 95 and RTU 90 will recognize its unique address identification signal in the polling signal, and process only the polling signals intended for the particular respective M-RTUs 95 and RTUs 90.

After each particular M-RTU 95 and RTU 90 receives its respective polling signal, each M-RTU 95 and RTU 90 can respond to the polling signal by generating response signals. These response signals are received by antenna. 300 of the central transmitter/receiver 85 and are provided to the cable control station 5 through receiver 320 and digital data computing device 340. These response polling signals may indicate whether the devices to which the M-RTUs 95 or RTUs 90 are connected are functioning.

As discussed above as a specific example, the system of the present invention may periodically generate polling signals to determine whether the amplifiers 10, standby batteries 70 or cell relays 80 are operating properly. In this situation, the system of the present invention generates specific polling signals for each specific M-RTU 95(1) and 95(3) connected to an amplifier 10. When each of the M-RTUs 95(1) and 95(3) connected to the amplifier 10 receives such polling signals, each of the M-RTUs 95(1) and 95(3) determines whether the amplifier 10(1) and 10(2) connected thereto is properly functioning. Each M-RTU 95(1) and 95(3) then provides a unique response signal based on whether the specific amplifier 10(1) and 10(2) connected thereto is properly functioning. This response signal is then received by the central transmitter receiver unit 85 to provide the information as to the operation of the amplifier units 10 to the cable control station 5.

Another type of signal which can be transmitted by the central transmitter/receiver unit 85 is an actual control signal which can control an action of the taps connected to the M-RTUs 95 and RTUs 90.

For example, if a user 20 changes his/her level of cable service, e.g. to receive an extra premium or pay channel, the system of the present invention allows this change in service to be implemented remotely, i.e. without requiring a cable technician to physically change a cable connection at the appropriate tap 15. This operation of the present invention works as follows. Assume that the user 20(1) has changed his/her cable subscription package to receive an extra pay channel. The cable control station 5 of the present invention then generates a signal which is provided to central transmitter/receiver unit 85. This signal will specifically address the M-RTU 95(4) which is connected to the tap 15(2), which in turn controls the signals provided to user 20(1). This specific signal generated by the central transmitter/receiver unit 85 controls the tap 15(2) to allow the extra pay channel to be transmitted to the user 20(1). In this operation of the present invention, the tap 15(2) can be controlled, to operate as essentially a smart tap device, and this allows the cable system to remotely control the contents of the cable signal supplied to the user 20(1).

In this way, in the present invention the central transmitter/receiver 85 can generate control signals which can open or close a signal path or channel that a user 20 ultimately receives. Other types of signals which can be transmitted by central transmitter/receiver unit 85 are other polling signals, a signal which authorizes the M-RTUs 95 to conduct a signal strength test and report the results thereof, authorizing the M-RTUs 95 to automatically broadcast a signal indicating that a cable signal has dropped to levels below a predetermined threshold, or any other actions which may be required by the cable operation.

Figure 4:
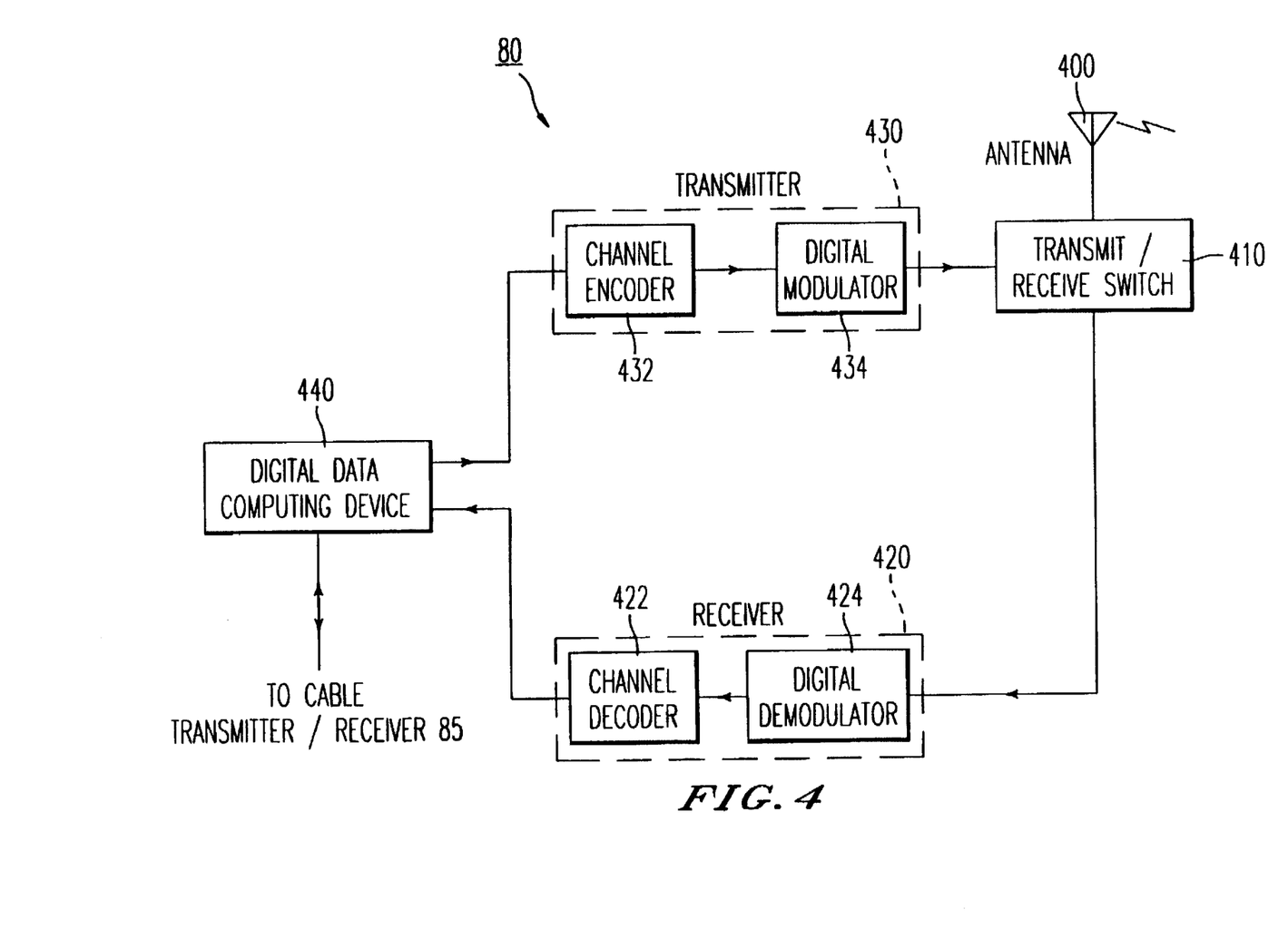
FIG. 4 shows the details of a cell relay shown in FIG. 2.

FIG. 4 shows the details of a cell relay 80, which is an optional element in the present invention. The function of the cell relay 80 is to receive signals from the individual M-RTUs 95 and RTUs 90, and to relay such signals to the central transmitter/receiver unit 85. The cell relay 80 can be connected to the central transmitter/receiver 85 either by wire or by a wireless communication. The use of cell relay 80 allows the M-RTUs 95 and RTUs 90 to be of a lower power than would otherwise be necessary if the M-RTUs 95 or. RTUs 90 directly communicated with the central transmitter/receiver 85. The distance between the M-RTUs 95 and RTU units 90 to the cell relay 80 is generally much less than the distance from the M-RTUs 95 and RTUs 90 to the cell transmitter/receiver 85.

As is shown in FIG. 4, the cell relay 80 has a similar construction to the cell transmitter/receiver 85 in that the cell relay 90 features a transmitter 430 which includes a channel encoder 432 and digital modulator 434, a transmit/receive switch 410 and an antenna 400. On the reception side a receiver 420 includes a channel decoder 422 and a digital demodulator 424. The data transmitted and received also passes through a digital data computing device 440. This cell relay 80 operates essentially as a conduit for information and its main objective is to ensure that the signals received are equivalent to the signals transmitted in content. In the present invention several cell relay units 80 may be dispersed throughout the cable franchise area.

Figure 5:
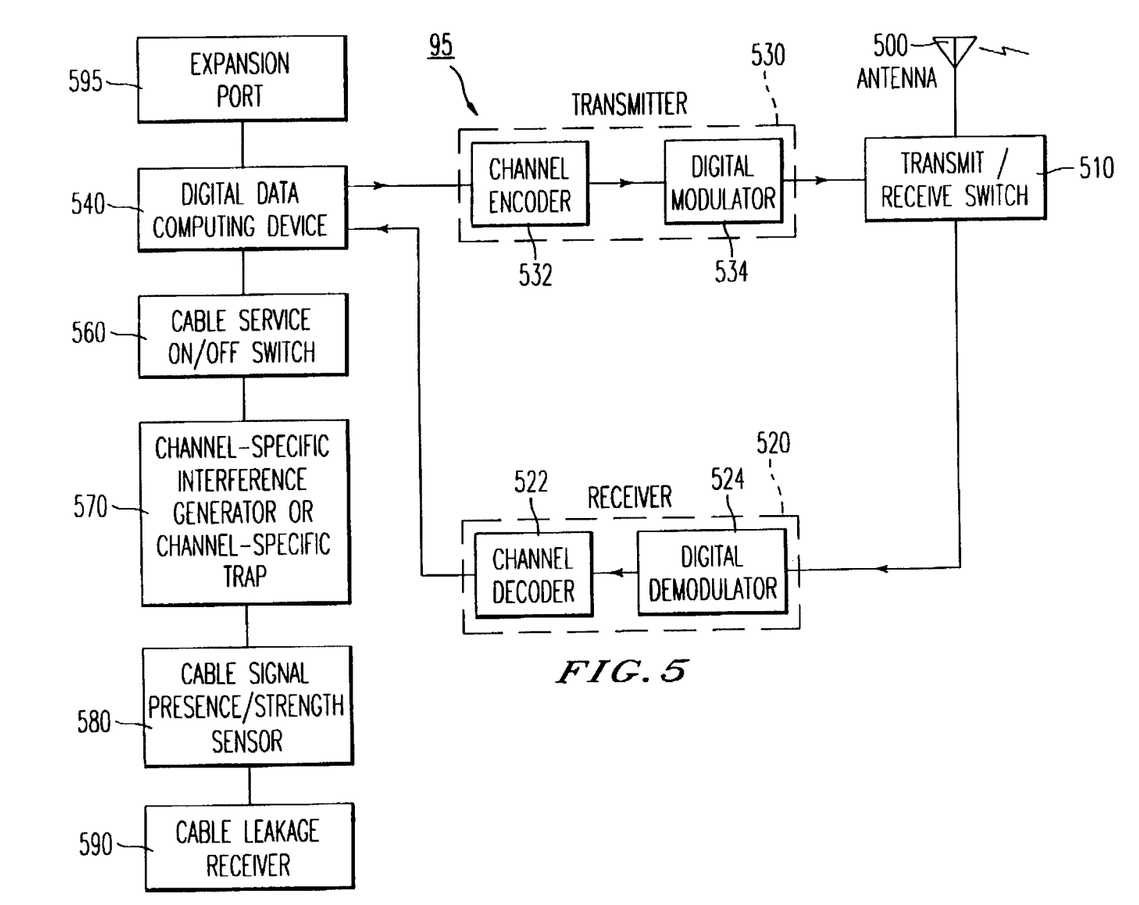
FIG. 5 shows the details of a micro-response transmitting unit (M-RTU) shown in FIG. 2.

The specifics of the M-RTUs 95 are shown in FIG. 5 of the present specification. Each of these M-RTU 95 features a transmitter 530 which includes a channel encoder 532 and a digital modulator 534, a receiver 520 which includes a channel decoder 522 and a digital demodulator 524, a transmitter/receive switch 510 and an antenna 500, similarly as discussed above with respect to the central transmitter/ receiver 85 and cell relay 80. Furthermore, a digital data computing device 540 provides the transmission signals and receives the reception signals, which device may be a lower-power computing device such as a 4 bit or 8 bit microprocessor controller circuit card. These noted elements in the M-RTU unit 95 having similar operations as discussed above in that these elements transmit and receive data and can encode the data to be received by only specific M-RTUs 95.

As shown in FIG. 5, also connected to the digital data computing devices is an expansion port 595, a cable service on/off switch 560, a channel-specific interference generator or channel-specific trap 570, a cable signal presence/strength sensor 580 and a cable leakage receiver 590.

The expansion port 595 is essentially a port which can allow future expansion of the M-RTU 95. The cable service on/off switch 560 is a control device which can completely deactivate cable service. This switch 560 can be used, for example, if a user 20 cancels a cable subscription, then switch 560 can completely shut off cable service to the designated user 20.

Channel-specific interference generator or channel-specific trap 570 is used to control the level of service to the user 20. Cable systems will have different levels of service, for example, basic service, premium service and various premium channels. The channel-specific interference generator or channel-specific trap 570 controls which channels are actually fed to a user 20 based on the level of service which the user 20 has paid for. In this way, the M-RTU 95 can control the signals provided to the user 20.

Cable signal presence/strength sensor 580 monitors the amplitude of the cable signal provided to the user 20. The cable signal presence/strength sensor 580 can be activated either by a polling signal transmitted by the central transmitter/receiver unit 85 or can continuously monitor the cable signal presence/strength, and automatically activate the M-RTU 95 to output an indication signal if the cable signal amplitude falls below a predetermined level. It is also possible in the present invention to not attach M-RTUs 95 to the amplifiers 10. In this situation, the output of the cable signal presence/strength sensor 580 will provide an insight as to whether an amplifier 10 is malfunctioning.

The cable leakage receiver 590 can be used to continuously, or by a polling signal generated by central transmitter/receiver 85, monitor signal leakage or radiation, such as required by the FCC. As the M-RTUs 95 may typically be mounted on an auxiliary pole on which the tap 15 is mounted, and as these M-RTUs 95 may be provided throughout the cable service area, the cable leakage receiver 590 will provide a good indication of signal leakage or radiation.

The M-RTU device as shown in FIG. 5 is the device which will be typically connected to the taps 15. If a M-RTU device as is connected to an amplifier 10, standby batteries 70 or cell relay 80, such a device would not require the cable service on/off switch 560 or the channel-specific interference generator or channel-specific trap 570. In this situation, the M-RTUs 95 connected to the amplifiers 10, standby batteries 70 or cell relay 80 may only feature the expansion ports 595, the cable signal presence/strength sensor 580 and the cable leakage receiver 590 and other specific circuitry to test amplifiers 10, standby batteries 70 or cell relay 80.

Figure 6:
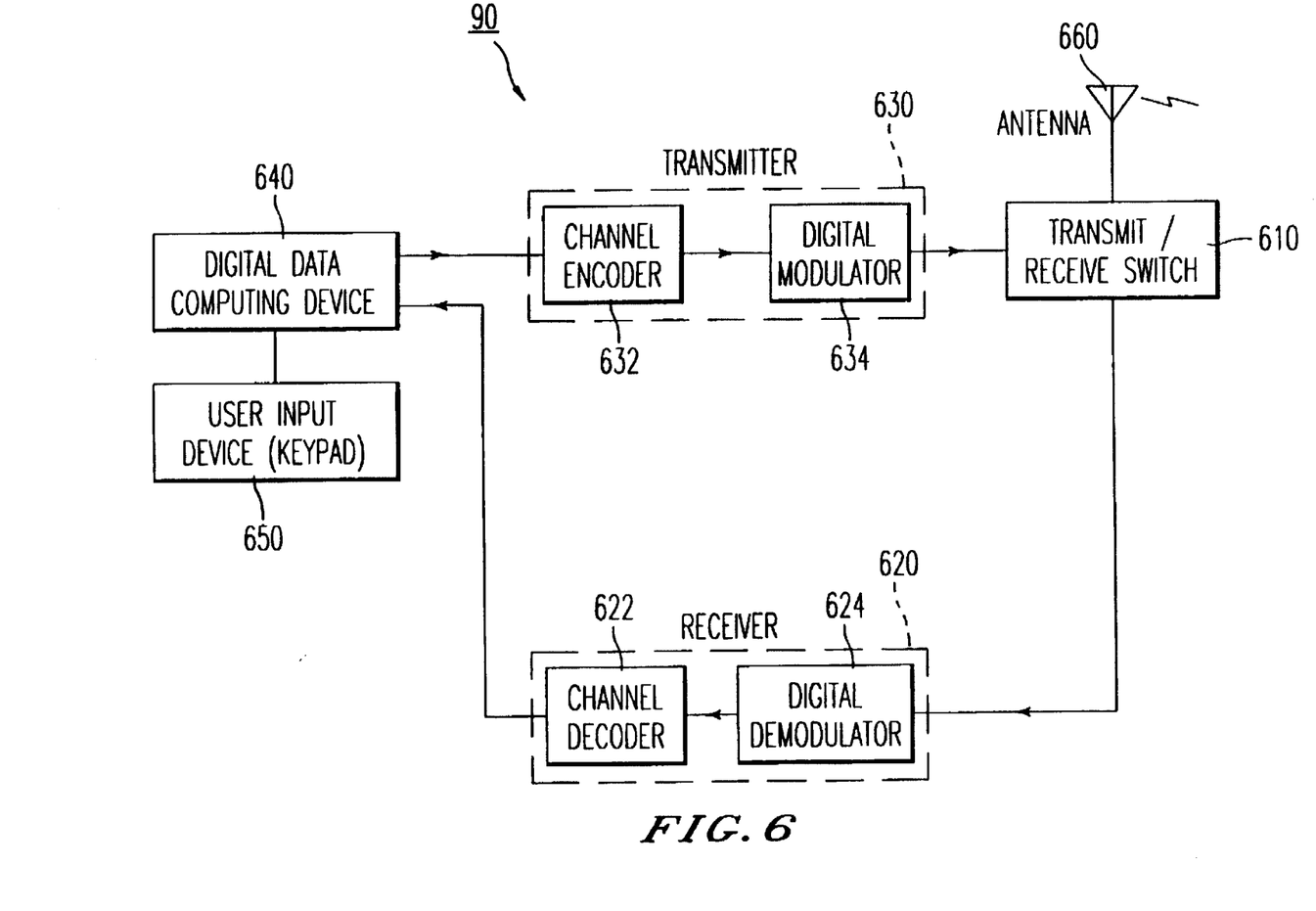
FIG. 6 shows the details of a response transmitting unit (RTU) shown in FIG. 2.

FIG. 6 shows the details of the response transmitting units RTU 90. The response transmitting units 90 feature transmitter 630 which includes a channel decoder 632 and a digital modulator 634, a transmitter/receive switch 610, an antenna 600, and receiver 620 which includes a channel decoder 622 and a digital demodulator 624, similarly as discussed above with respect to the central transmitter/ receiver unit 85, cell relay 80 and M-RTUs 95. Further, the signals transmitted and received by the RTUs 90 are input into a digital data computing device 640, which in turn is connected to a user input device 650. This user input device 650 may be any type of input device such as a remote control keypad.

The use of the RTUs 90 provides each individual cable user 20 with a form of direct control over the cable service for each individual user 20. The RTUs 90 allow information input from the user 20 via the user input device 650 to be transmitted to the M-RTUs 95, to the central cell relay 80 or to the central transmitter/receiver 85.

As one example of the operation of the RTUs 90, these RTUs 90 can be used by each individual user 20 to select a pay-per-view program in the following manner. If a pay-per-view program is available, and if a user 20 specifically desires to purchase such a pay-per-view program, the user 20 will activate the user input device 650 in the RTU 90, which typically will be connected, either by wire or wirelessly, to the cable box inside the user's home. The digital data computing device 640 will then interpret this input as an indication that the user 20 wishes to purchase a specific pay-per-view program, and digital data computing device 640 generates a control signal based on this input.

This control signal is then encoded in channel encoder 632, and the signal is then modulated in digital modulator 634 and then radiated by antenna 600. As this signal is a request for the user 20 to receive a pay-per-view program, the signal radiated by antenna 600 will be received by the M-RTU 95 which is connected to the tap 15 which supplies the cable signal to the individual user 20.

With reference to FIG. 2 of the present specification as an example, if user 20(1) selects a particular pay-per-view program, user 20(1) provides such an input on a user input pad 650 in the RTU 90(1). The RTU 90(1) then transmits a signal to the M-RTU 95(4), which in turn controls the tap 15(2) which supplies the cable signal to the user 20(1). When the M-RTU 95(4) receives this request from the user 20(1), the channel-specific interference generator or channel-specific trap 570 formed in the M-RTU 95(4) controls the tap 15(2) to allow the specifically selected pay-per-view program to be supplied to the user 20(1).

Further, the M-RTU 95(4) also transmits a confirmation signal to the cell relay 80 which indicates that the user 20(1) has a selected the particular pay-per-view program. This signal is then relayed to the central transmitter/receiver 85 and is then provided to the cable control station 5. This confirmation signal which confirms the operation of the M-RTU 95(4) is supplied to the cable control station 5 so that the cable control station 5 can have an accurate and automatic accounting of the pay-per-view selection of the user 20(1). In this operation of the present invention, the user 20(1) can individually control the pay-per-view selection, and the cable control station 5 will have an accurate accounting thereof so that the user 20(1) can be appropriately billed.

The RTUs 90 can also receive signals from the central transmitter/receiver 85 or M-RTU 95(4), which signals may, as an example, poll whether the RTUs 90 are operating properly. Further, responses to these polling signals in the RTUs 90 can then be directly transmitted to the cell relay 80 or central transmitter/receiver 85, i.e., responses to such polling signals need not be transmitted to the M-RTUs 95.

As a further possibility of the operation of the RTUs 90, these RTUs 90 can be used to poll a user. For example, the cable control station 5 may send a polling signal to each of the users 20. Each of the users 20 can then respond to this polling signal by inputting a specific data into user input device 650. This data will then be transmitted back to the cable control station 5 through the cell relay 80 and central transmitter/receiver 85. In this situation the RTUs 90 will directly communicate with the cell relay 80 or central transmitter/receiver 85 and again bypass the M-RTUs 95.

The system of the present invention can also be used to accurately monitor which programs a household is watching. It is a concern of television programmers to have an accurate indication of which programming a user is watching. This is conventionally done by polling services in which a user must keep a written log of the programming they watch. By the use of the present invention, the RTUs 90 through the digital data computing device 640 can keep an accounting of which channel a user is watching, and this information can then be automatically transmitted back to the cable control station 5. With such an operation, a very accurate record of a user's viewing habits can be obtained which does not rely on the user to make any efforts.

Clearly, other possibilities of the system of the present invention are also possible. The system of the present invention has been described at this time in a particular environment of a cable television system. However, the system of the present invention can find other applications in other environments.

As an example, the system of the present invention could also be used to monitor power use. At this time power usage by homes and businesses is measured through meters which must be manually read by a technician from the power company. The system of the present invention could clearly find application in that a modified micro-response transmitting unit of the present invention could be attached to such power meters. In this situation, in response to periodic polling signals the micro-response transmitting units could provide a central control station with an indication of the power usage. In such a situation the micro-response transmitter units could also alert a central control station as to a malfunction in a power meter.

The present invention can also be used in a demand side management system for electrical and gas utility plants, as it would eliminate the use of a dedicated telephone line therefore.

The present invention can also find particular use in monitored home security systems, which presently are dependent on hard wire telephone systems.

Specifically, current electronic home security systems are commonly found to be of many and varied types. Such systems range from very simple devices attached to doors which sound an alarm when the door is moved or shaken, to elaborate self-contained video systems, inclusive of on-premise security guards. Of all these systems, the two most generally used are on-premise alarm only systems or central station monitoring systems.

In the case of an on-premise alarm only system, the doors, windows and other means of ingress and egress of the house are wired with electrical contacts. When the circuit of one or all of these contacts is broken an on-premise alarm sounds. This alarm will alert neighbors in the immediate area of a break-in. A central station monitoring system is similarly wired. However, in addition to the on-premise alarm, a central station is linked by hardware telephone lines and a digital dialer. This central station receives a signal that an electrical circuit in a contact at a particular house has been broken. With the use of this central station monitoring system, central station personnel can take immediate procedural action to alert proper authorities of a break-in.

The drawbacks with such conventional systems is that if the systems themselves have any malfunctioning elements, the malfunction of these elements is not brought to anyone's attention. The present invention can overcome such drawbacks by setting forth a two-way wireless link between a home and a central station. The wireless nature of the system of the present invention provides additional security in that there is no wire that can be cut by a perpetrator. The present invention may specifically utilize a modified form of an M-RTU as discussed above in the environment of the cable television system. The M-RTU used in the home security device will be connected to the home security device to determine its operation and functionality. Further, in the present invention the M-RTU will be continuously or systematically polled for diagnostic testing to determine whether any element in the home security system is not operating properly. This provides a significant advantage over existing systems which have no way of automatically detecting a malfunction.

In addition to normal security, the use of a M-RTU as in the present invention provides an ability to wirelessly link a home to a central station for emergencies such as regarding air quality, i.e. carbon monoxide or other household contaminants, to link the system to a wireless hand-held ingress and egress control and to link the home security system to the local cable CATV system for on-screen reporting of an internal home status and external neighborhood watch and alert programs. Further, the system of the present invention can also be used for fire and medical alert situations.

The system of the present invention may have a configuration in which a M-RTU is installed in the eaves of a house or in another secure location. This M-RTU is connected to the home security system to monitor and control all contacts on the windows, doors and other ingress and egress portals of the house. The control link can be deployed wirelessly or by an internal home hardwired network. Communication signals are received at the M-RTU from a central transmitter/receiver unit such as disclosed in FIG. 2 with respect to the cable television environment of the present invention. The M-RTU may transmit, in response to polling signals or periodically self-generated signals, signals from the home to the central transmitter/receiver. These signals contain specific messages, such as a diagnostic of the operation of the home security system, which are then transmitted to a central control station, and thus has a similar operation as discussed above with respect to the system disclosed in FIG. 2 of the present invention.

The present invention can also find particular use in inventory control systems such as for a vending machine industry as it can provide a low cost method of reporting inventory levels of vending machines without the need for an expensive hardwired link or without the need for visual inspection.

The present invention can also find particular application in environmental protection monitoring systems because the M-RTUs of the present invention can be economically placed within an extensive geographical grid and can be attached to existing sensors which report levels of pollution via radio frequency.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by letters patent of the United States is:

1. A communication system for a cable television system in which a central location transmits signals along a coaxial cable to a user unit through a tap, comprising:

a central transmitting/receiving unit for wirelessly transmitting a first signal generated at the central location and for receiving a second signal;

a first response unit for receiving the first signal wirelessly transmitted from the central transmitting/receiving unit and for generating and wirelessly transmitting the second signal to be received by the central transmitting/receiving unit;

a second response unit connected to the user unit, wherein the second response unit generates a third signal;

wherein the first response unit is connected to the tap and receives the third signal, and the second signal includes an indication of the third signal.

2. The communication system according to claim 1, further comprising a relay unit for receiving the second signal generated and transmitted by the first response unit and for relaying the second signal to the central transmitting/receiving unit.

3. The communication system according to claim 1, wherein the first signal comprises a polling signal for polling an operation of the first response unit, and the second signal comprises response signals in response to the polling signal.

4. The communication system according to claim 1, wherein the third signal controls an operation of the tap.

5. The communication system according to claim 1, wherein the third signal comprises polling signals and the second signal comprises response signals in response to the polling signals.

6. The communication system according to claim 1, wherein the first response unit comprises a controller for controlling an operation of the tap based on the first and third signals.

7. The communication system according to claim 6, wherein the controller comprises a cable service on/off switch for controlling a supply of the cable signals to the user based on the first signal generated by the central transmitter/receiver unit.

8. The communication system according to claim 6, wherein the controller comprises a channel specific controller to control channels supplied to the user based on the first or third signals.

9. The communication system according to claim 7, wherein the controller comprises a channel specific controller to control channels supplied to the user based on the first or third signals.

10. The communication system according to claim 6, wherein the controller comprises a cable signal presence/strength sensor for detecting a presence and strength of the cable signals, and for generating the second signal in response an output of the cable signal presence/strength sensor.

11. The communication system according to claim 9, wherein the controller comprises a cable signal presence/strength sensor for detecting a presence and strength of the cable signals, and for generating the second signal in response an output of the cable signal presence/strength sensor.

12. The communication system according to claim 6, wherein the controller comprises a cable leakage receiver for detecting a radiation leakage of the cable signals, and for generating the second signal in response to an output of the cable leakage receiver.

13. The communication system according to claim 11, wherein the controller comprises a cable leakage receiver for detecting a radiation leakage of the cable signals, and for generating the second signal in response to an output of the cable leakage receiver.

14. A micro-response unit to be connected to a tap in a cable television communication system providing cable signals to a user, comprising:

a receiver for receiving a first signal from a central control station and a second signal from a user connected to the tap;

a controller for controlling an operation of the tap based on the received first and second signals; and a transmitter for transmitting a third signal.

15. The micro-response unit according to claim 14, wherein the controller comprises a cable service on/off switch for controlling a supply of the cable signals to the user based on the received first signal.

16. The micro-response unit according to claim 14, wherein the controller comprises a channel specific controller to control channels supplied to the user based on the received first signal.

17. The micro-response unit according to claim 15, wherein the controller further comprises a channel specific controller to control channels supplied to the user based on the received first signal.

18. The micro-response unit according to claim 14, wherein the controller comprises a cable signal presence/strength sensor for detecting a presence and strength of the cable signals, and for generating the third signal in response to an output of the cable signal presence/strength sensor.

19. The micro-response unit according to claim 17, wherein the controller further comprises a cable signal presence/strength sensor for detecting a presence and strength of the cable signals, and for generating the third signal in response an output of the cable signal presence/strength sensor.

20. The micro-response unit according to claim 14, wherein the controller comprises a cable leakage receiver for detecting a radiation leakage of the cable signals, and for generating the third signal in response to an output of the cable leakage receiver.

21. The micro-response unit according to claim 19, wherein the controller further comprises a cable leakage receiver for detecting a radiation leakage of the cable signals, and for generating the third signal in response to an output of the cable leakage receiver.

22. The micro-response unit according to claim 14, wherein the controller comprises a channel specific interference generator or channel-specific trap to control channels supplied to the user based on the received second signal.

23. The micro-response unit according to claim 14, wherein the second signal is a polling signal and the third signal indicates information of the second polling signal.

24. The micro-response unit according to claim 14, wherein the third signal indicates a status of the tap.

* * * * *